(12) United States Patent
Bultitude et al.

(10) Patent No.: US 9,087,648 B2
(45) Date of Patent: Jul. 21, 2015

(54) ASYMMETRIC HIGH VOLTAGE CAPACITOR

(71) Applicant: Kemet Electronics Corporation, Simpsonville, SC (US)

(72) Inventors: John Bultitude, Simpsonville, SC (US); Lonnie G. Jones, Simpsonville, SC (US); James R. Magee, Simpsonville, SC (US); Kitae Park, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 271 days.

(21) Appl. No.: 13/849,806

(22) Filed: Mar. 25, 2013

(65) Prior Publication Data

US 2013/0250473 A1    Sep. 26, 2013

Related U.S. Application Data

(60) Provisional application No. 61/615,487, filed on Mar. 26, 2012.

(51) Int. Cl.

| | |
|---|---|
| *H01G 4/30* | (2006.01) |
| *H01G 4/005* | (2006.01) |
| *H01G 4/012* | (2006.01) |
| *H01G 4/232* | (2006.01) |

(52) U.S. Cl.
CPC .............. *H01G 4/30* (2013.01); *H01G 4/012* (2013.01); *H01G 4/232* (2013.01); *Y10T 29/435* (2015.01)

(58) Field of Classification Search
USPC ....................................... 361/301.4, 311, 303
See application file for complete search history.

(56) References Cited

U.S. PATENT DOCUMENTS

| | | | | |
|---|---|---|---|---|
| 4,312,023 | A | * | 1/1982 | Frappart et al. ............... 361/243 |
| 4,931,901 | A | * | 6/1990 | Heron, Jr. .................. 361/321.2 |
| 5,835,338 | A |   | 11/1998 | Suzuki et al. |
| 6,134,098 | A |   | 10/2000 | Kuroda |
| 6,627,529 | B2 |   | 9/2003 | Ireland |

(Continued)

FOREIGN PATENT DOCUMENTS

| | | |
|---|---|---|
| CN | 201332021 | 11/2008 |
| CN | 201332022 | 11/2008 |

(Continued)

OTHER PUBLICATIONS

International Search Report by ISA/KR dated Jul. 8, 2013; PCT/US2013/033693; Kemet Electronics Corporation.

*Primary Examiner* — Eric Thomas
(74) *Attorney, Agent, or Firm* — Joseph T. Guy; Perkins Law Firm, LLC

(57) ABSTRACT

An improved multi-layered ceramic capacitor, and method of making the multi-layered ceramic capacitor, is described. The capacitor has an active area comprising first layers and second layers in alternating parallel arrangement with dielectric there between. The first layer comprises a first active electrode and a first floating electrode in a common plane and the second layer comprises a second active electrode and a second floating electrode in a second common plane. At least one shield layer is adjacent to an outermost first layer of the first layers wherein the shield layer has a first projection and the first layers have a second projection wherein the first projection and the second projection are different.

27 Claims, 9 Drawing Sheets

(56) References Cited

U.S. PATENT DOCUMENTS

| | | |
|---|---|---|
| 6,683,782 B2 | 1/2004 | Duva |
| 6,760,215 B2 | 7/2004 | Devoe |
| 7,027,288 B2 | 4/2006 | Shimizu |
| 7,336,475 B2 | 2/2008 | Bultitude |
| 7,715,173 B2 | 5/2010 | Bultitude et al. |
| 8,059,387 B2 | 11/2011 | Yoon |
| 8,238,075 B2 | 8/2012 | Bultitude |
| 2009/0002918 A1* | 1/2009 | Kawasaki et al. ............. 361/311 |

FOREIGN PATENT DOCUMENTS

| | | |
|---|---|---|
| JP | 07-135124 A | 5/1995 |
| JP | 07-263270 A | 10/1995 |
| JP | 2000133545 A * | 5/2000 |

* cited by examiner

ASYMMETRIC HIGH VOLTAGE CAPACITOR

CROSS-REFERENCE TO RELATED APPLICATIONS

This application claims priority to U.S. Provisional Patent Appl. No. 61/615,487 filed Mar. 26, 2012 which is incorporated herein by reference.

BACKGROUND

The present invention is related to improved multi-layered ceramic capacitors (MLCC's). More specifically, the present invention is related to multi-layered ceramic capacitors comprising at least two active overlap regions with shields which are not aligned with active electrodes.

In any component comprising two electrodes of opposed polarity there is a tendency towards arcing at given applied voltage. Many factors can affect the voltage at which the arcing occurs with the distance that separates the electrodes being but one key factor. The tendency for surface arcing in air has been exploited to dissipate energy to ground as exemplified in U.S. Pat. No. 5,915,757 wherein described is the relationship between the gap size and arc voltage in air. However, in electronic components, such as capacitors, if arcing occurs it can cause electrical breakdown, which can disrupt, or destroy, other components connected to the capacitor thereby compromising the entire circuit. In most applications surface arcing limits the voltage at which the capacitor can be used.

It is known in the art to apply coatings to either the capacitor, or to the circuit after assembly, to prevent arcing. In addition to the expense associated with additional coatings any mechanical damage to the coating can compromise performance.

Shield electrodes have been applied in lower voltage multilayer ceramic capacitors for ratings less than about 2500V. High voltage rated MLCC 500V) are known to be produced with serial designs and shield designs. Serial designs have 2 or more capacitors in series within the component wherein an even number of capacitors is employed which allows a symmetric electrode print pattern to be employed during manufacture. The voltage is divided between the serial capacitors resulting in high voltage capability at lower capacitance. For any given number of capacitors in series (N) the acting voltage on each capacitor is reduced by the reciprocal of the number of capacitors (1/N) but the effective total capacitance is reduced according to following equation:

$$1/C_{Eff} = \Sigma 1/C_N.$$

Serial designs have been used in MLCC's for many years. Typically, an even number of coplanar active electrodes are arranged between floating electrodes so that within a given electrode print plane coplanar active electrodes of opposite polarity contact terminals of opposing polarity and the floating electrodes are parallel to the active electrodes and separated from the active electrodes by a dielectric. The floating electrodes are not in contact with either terminal. These arrangements of electrodes result in an even number of capacitors stacks in series within each MLCC. The serial designs exhibit very high voltage breakdown in inert fluid but in air the breakdown voltage is significantly lower. The inert fluid prevents arcing so the lower voltage breakdowns observed in air are due to surface arcing.

To avoid surface arcing MLCC's rated at greater than 2000V, with X7R dielectric for example, are coated thereby providing an arcing performance in air which is closer to the arcing obtained in inert fluid. However, coatings do have inherent disadvantages. Coatings are expensive either for the MLCC or for the circuit after assembly since it requires additional processing steps and additional materials. Coated MLCC's, or coated circuit boards, are not compatible will all types of subsequent assembly processes which limits the application. Uncoated parts are not easily screened at voltages>2 kV. Mechanical damage to the coating can compromise performance.

High capacitance, high voltage MLCC's, such as 22,000 pF, have been described with a shield electrode and a single electrode overlap area. The internal breakdown voltage is limited to the ability of the active area between the electrodes to sustain high voltage for prolonged periods without failing. Increasing the active thickness does increase the breakdown voltage but at the expense of lowering capacitance. In practice, the shield type designs therefore have an advantage with respect to achieving higher capacitance, such as <2 kV X7R MLCC with X7R dielectric.

In spite of the ongoing efforts those of skill in the art still do not have a suitable option for high capacitance, high voltage, MLCC's which are not susceptible to arcing at lower voltages. Such an MLCC is provided herein.

SUMMARY OF THE INVENTION

It is an object of the invention to provide an improved MLCC.

It is an object of the invention to provide an MLCC which can operate at high voltage yet the MLCC is not susceptible to arcing at low voltages in air.

A particular advantage of the present invention is the ability to manufacture the improved MLCC using standard manufacturing practices.

These and other advantages, as will be realized, are provided in a multi-layered ceramic capacitor. The capacitor has an active area comprising first layers and second layers in alternating parallel arrangement with dielectric there between. The first layer comprises a first active electrode and a first floating electrode in a common plane and the second layer comprises a second active electrode and a second floating electrode in a second common plane. At least one shield layer is adjacent to an outermost first layer of the first layers wherein the shield layer has a first projection and the first layers have a second projection wherein the first projection and the second projection are different.

Yet another embodiment is provided in a method for forming a multilayer ceramic capacitor comprising:
forming interleaved first layers and second layers with dielectric there between wherein the first layers comprise first electrode patterns and the second layers comprise second electrode patterns and wherein the first electrode patterns and the second electrode patterns overlap in projection to form at least two active overlap regions; and
forming at least one shield layer adjacent an outermost first layer of the first layers wherein the shield layer has a projection of electrode pattern which is different than a projection of the first electrode pattern and different than a projection of the second electrode pattern.

FIGURES

Figure 3:
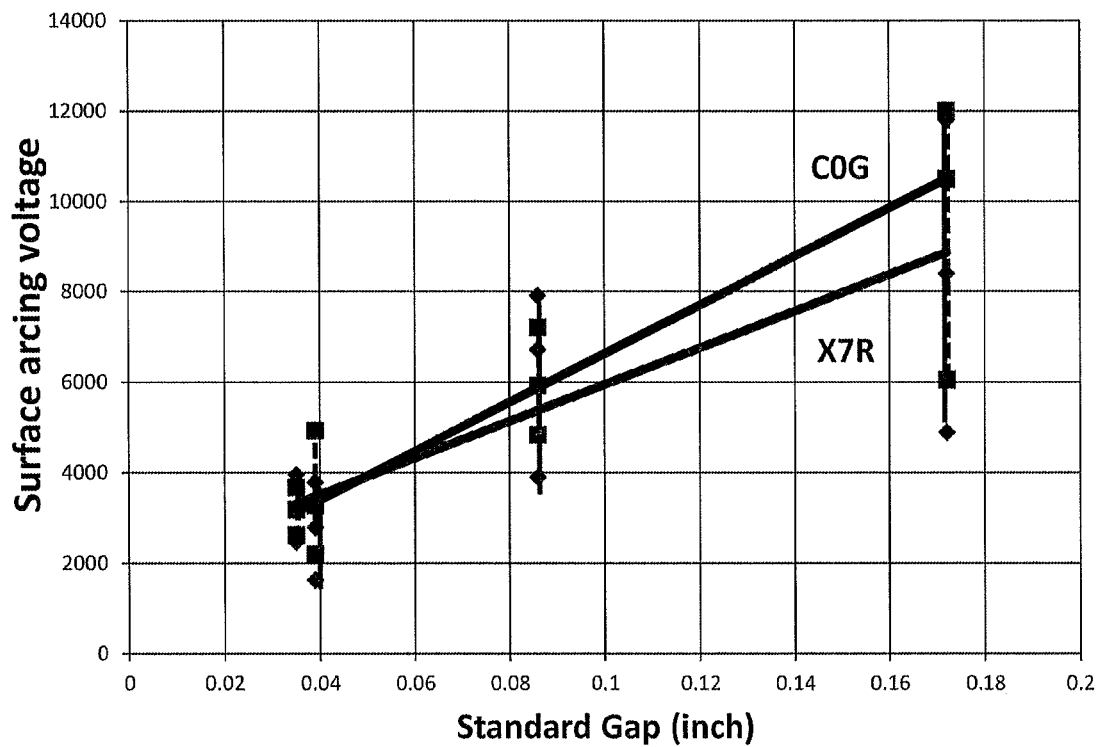

FIG. 3 graphically illustrated surface arcing voltage as a function of gap length without electrodes.

Figure 4:
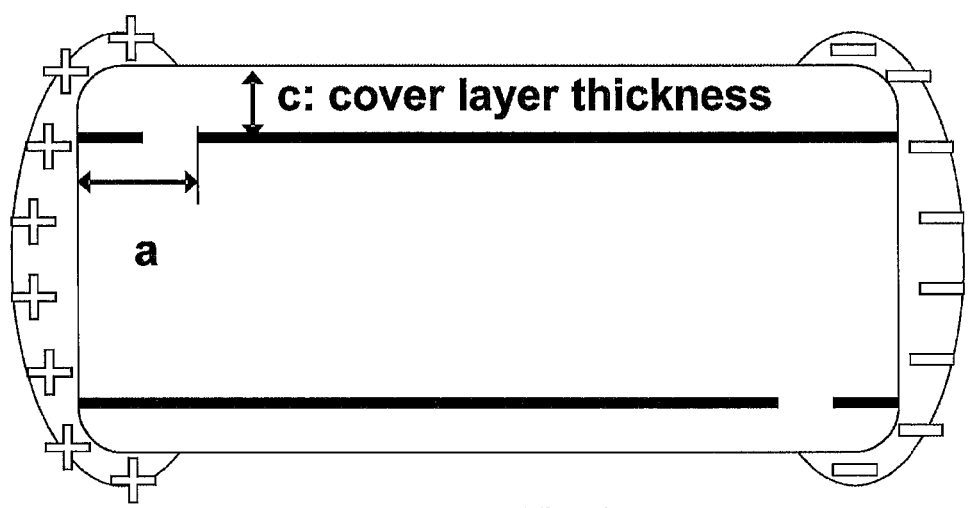

FIG. 4 illustrates a capacitor with end terminations for test purposes.

Figure 5:
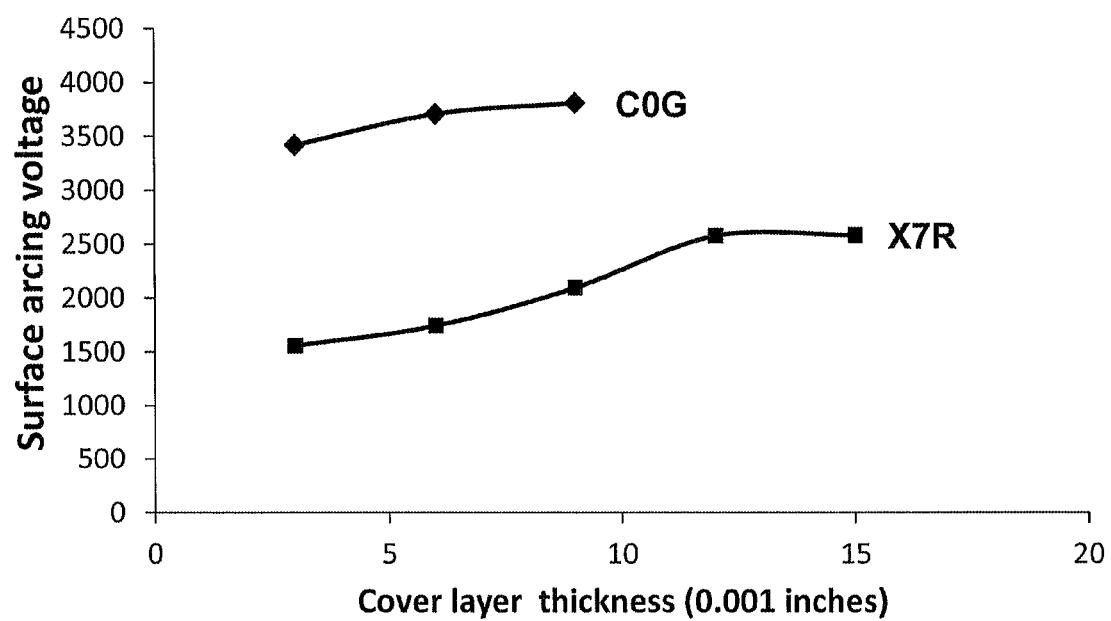

FIG. 5 graphically illustrates surface arcing voltage as a function of cover layer thickness.

Figure 6:
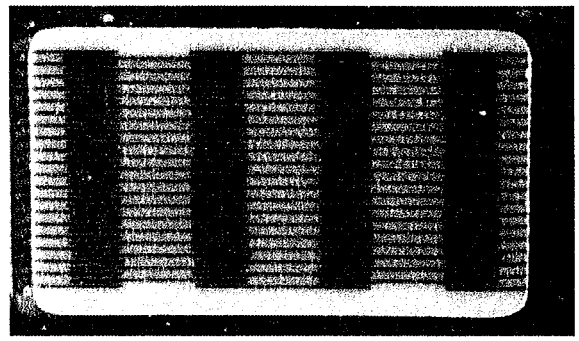
Figure 7:
Figure 8:
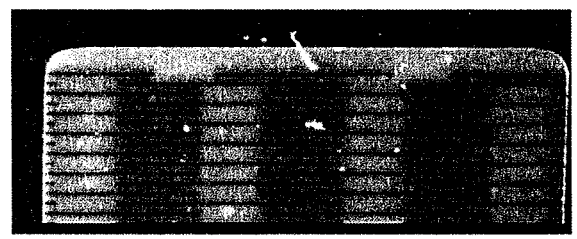

FIGS. 6-8 are cross-sectional scanning electron microscope images of MLCC's.

FIGS. 9-12 graphically represent ultimate breakdown voltage.

Figure 13:
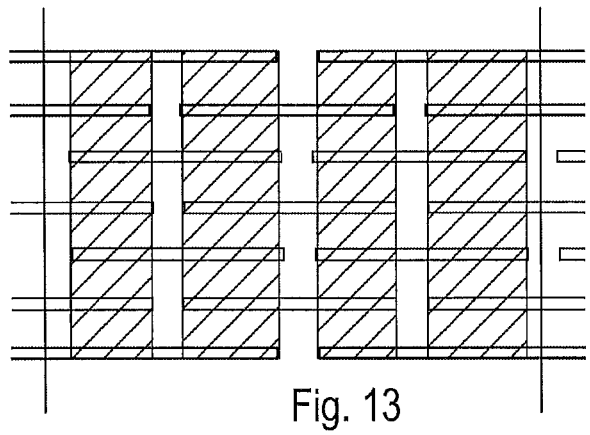

FIG. 13 is a side schematic illustration of an embodiment of the invention.

Figure 14:
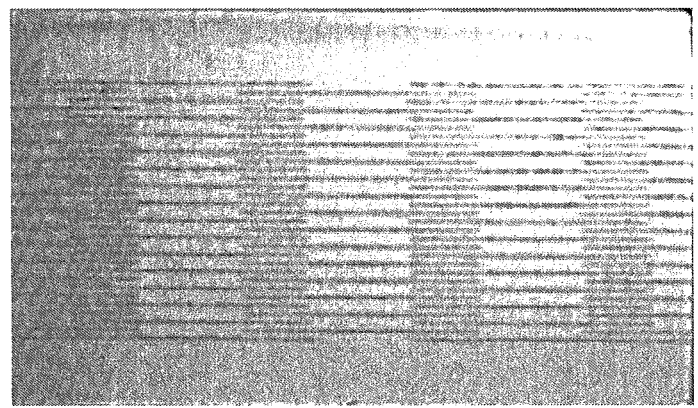
Figure 15:
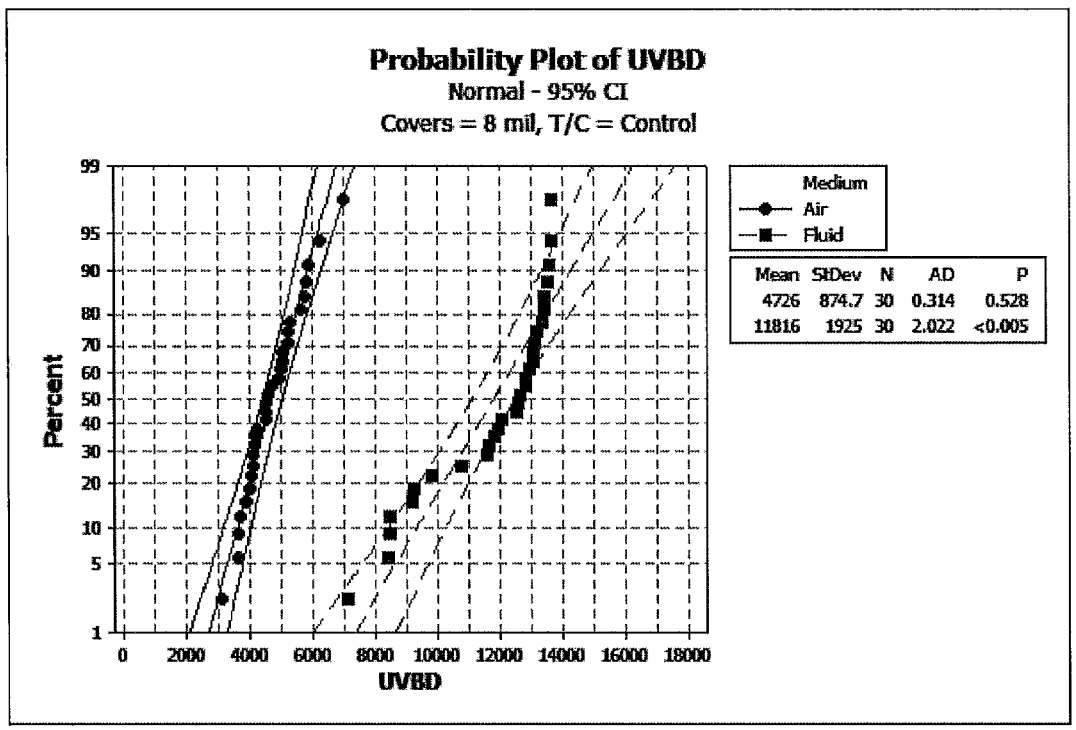
Figure 16:
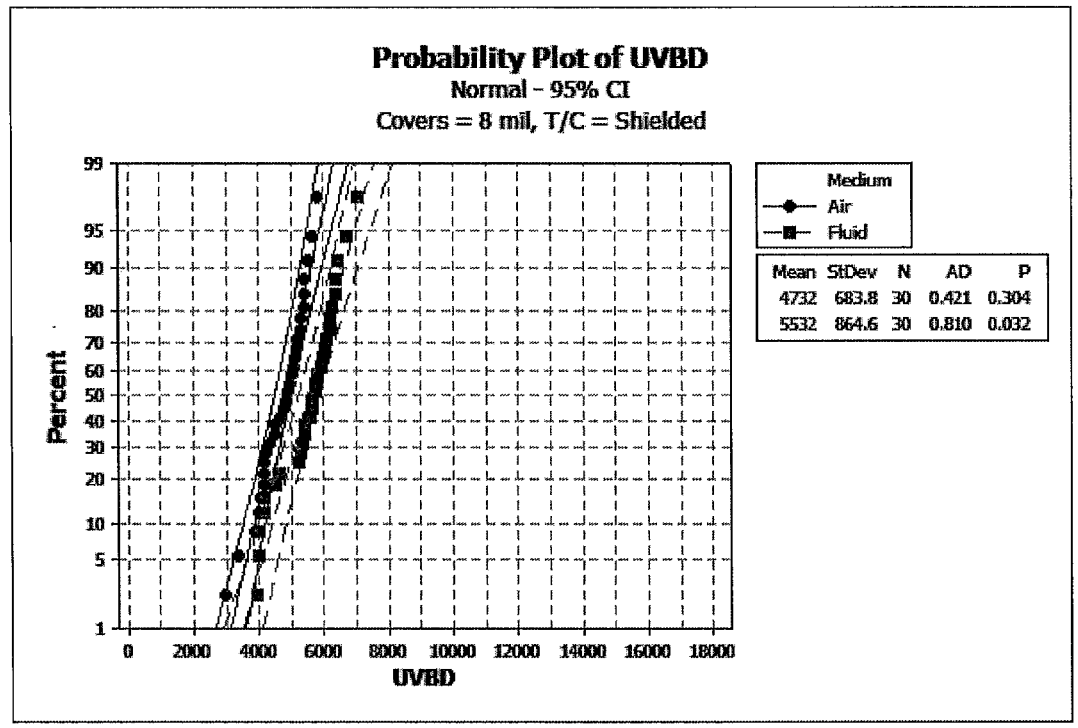
Figure 17:
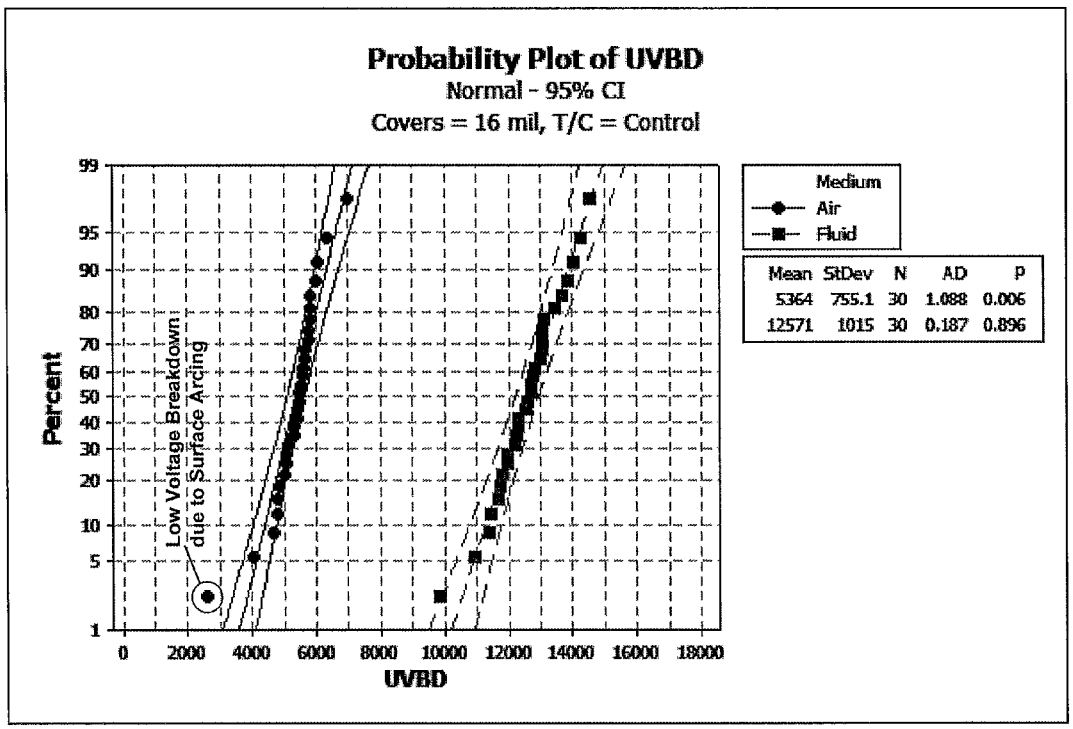
Figure 18:
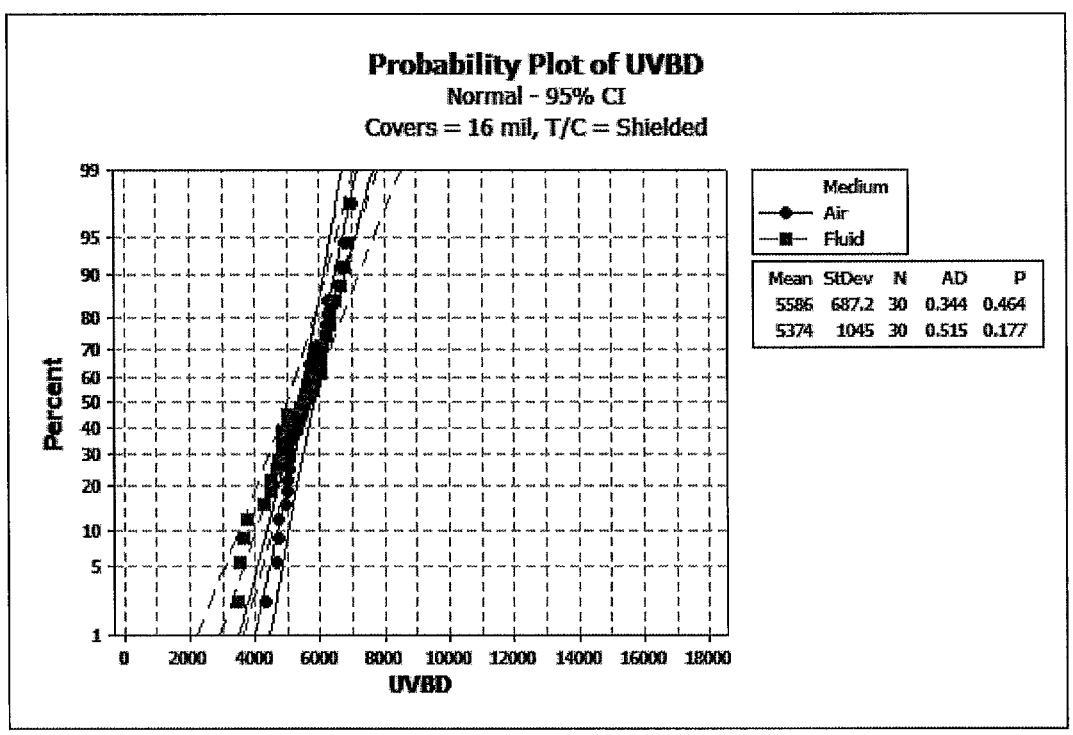

FIG. 14 is a cross-sectional scanning electron microscope image of an MLCC.

FIGS. 15-18 graphically represent ultimate breakdown voltage.

DESCRIPTION

The instant invention is specific to MLCC capacitors suitable for use with high voltage wherein the MLCC's use electrode patterns for shields that are asymmetrical in relative to the active electrodes, or that do not project, with the inner electrodes of the innermost electrode patterns forming the bulk capacitance of the capacitor. The active volume forming the bulk capacitance contains at least 2 capacitors in series. The asymmetric design increases the minimum voltages at which failures occur due to surface arcing thereby allowing capacitors which are suitable for use at higher voltages. The MLCC's can be manufactured without additional coatings on either the component or the electronic circuit comprising the component. They also allow more design flexibility to achieve the desired voltage capability and capacitance within a given dielectric thickness. The high breakdown voltage in air of these capacitors, with no failures at lower voltages due to arcing, allows reliable high voltage capacitors to be realized. The combination of shield electrodes and serial designs allows these components to be rated for higher voltages, such as over 2000V, which is higher than shield designs currently available in the prior art whilst prohibiting arcing failures in air that can occur with serial designs that do not contain the shield electrodes as described in this invention.

The invention will be described with reference to the various figures which form an integral non-limiting component of the disclosure. Throughout the disclosure similar elements will be numbered accordingly.

The asymmetric MLCC's comprise shield electrodes above and below the active overlap volume. The shield electrodes are assymetric with regards to the active electrodes forming the active volume represented by two or more capacitors in series within a common component.

For the purposes of the present invention an asymmetric MLCC is an MLCC with a shield electrode wherein the projection of the shield electrode, as viewed perpendicular to the largest face of the shield electrode, is not the same projection as the active electrodes when viewed in the same manner.

A shield electrode, for the purposes of the present invention, is an outermost electrode which is terminated the same as an adjacent active electrode and therefore of the same polarity as an adjacent active electrode. A shield layer comprises a shield electrode and, optionally, at least one floating electrode.

A floating electrode, for the purposes of the present invention, is an electrode which is parallel to an active electrode with a dielectric there between wherein the floating electrode is not terminated.

An active electrode for the purposes of the present invention is an electrode, excluding shield electrodes, which is terminated.

An active overlap region is a capacitor within an MLCC and is an area where adjacent electrodes, excluding shield electrodes, overlap in projection when viewed perpendicular to the large face of the electrodes. The active overlap regions are capacitors in series.

The present invention provides for at least two active regions with the number being limited by space and manufacturing limitations. An odd number or even number of capacitors can be formed in series within the same component.

In one aspect of this invention a serial type electrode pattern is combined with a top and bottom shield to prevent surface arcing whilst retaining a very high voltage breakdown in air without the use of conformal coatings or the aforementioned disadvantages of the prior art. A diagram of an embodiment of the invention is represented by the electrode prints illustrated schematically in FIG. 1.

Figure 1:
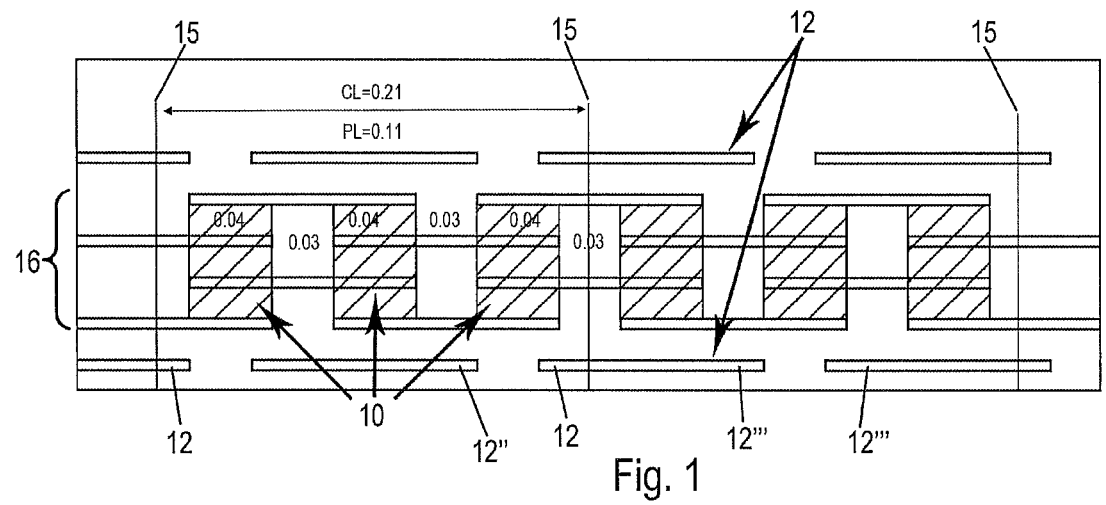
FIG. 1 is a side schematic illustration of an embodiment of the invention.

While not limited thereto, the cross-section illustrated in FIG. 1 is shown for an 1812 case size with unfired component length (CL), prior to singulation, shown at 5.3 mm (0.21") with an electrode print length (PL) of 2.8 mm (0.11"). There are 3 active overlap areas with cross-sectional length of (1.0 mm) 0.04" separated by gaps of (0.76 mm) 0.03" so this is a 3-serial active. Unlike a standard serial design within a given electrode print layer only one active electrode is terminated in any given electrode plane at the cut length shown formed by cutting at the cut lines, 15, hence this is an asymmetric pattern. It would be understood that the cut line represents the location of the external termination which is formed on the exposed surface. As demonstrated in this diagram only one pattern is required to form the shield, 12, and active layers, 16, forming shaded active areas 10. In the embodiment illustrated in FIG. 1 the shield layers alternate between a small electrode print, 12, contacting each termination with a large floating electrode, 12", between these in one cut pattern and in the adjacent cut pattern 2 larger shields, 12''' contact the terminal with no floating electrode. Although a single electrode pattern is advantageous with respect to manufacture of the MLCC it is possible to use a secondary print pattern to form a single shield pattern on the top and bottom of all the parts within a batch. As would be realized there are a large number of active electrodes which is not easily depicted schematically.

Using a similar pattern of electrodes it is possible to achieve a larger, odd number of capacitors in series within the active area. The advantage of using 5, 7, 9 or more overlap areas using this design is that the applied voltage is divided between more capacitors so although the capacitance is reduced, as explained earlier for serial designs, the voltage capability is increased with the number in series. In production for a given dielectric there is a limited number of tape thicknesses manufactured that restricts the active thickness of any given MLCC design. The ability to make an odd number of capacitors in series within the MLCC is especially useful for maximizing the capacitance for a given part and voltage rating by allowing for small adjustments in applied voltage stress that otherwise would require changes in the dielectric layer thickness. The top and bottom shield layers are not necessary to realize this benefit.

Figure 2:
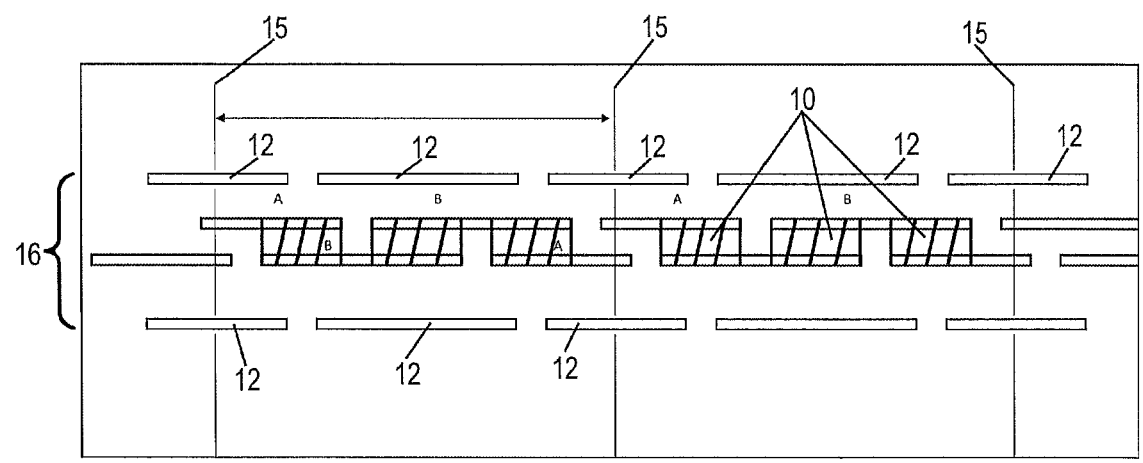
FIG. 2 is a side schematic illustration of an embodiment of the invention.

A preferred design is shown schematically in FIG. 2. In FIG. 2, 2 electrode prints of different lengths are shown as A & B in this figure. In this way a consistent shield layer, 12, can be accommodated in every part whilst forming 3 main overlap areas, 10. Any integral number of overlap areas can be achieved with 2, 3, 4, 5, 6, 7, 8 or 9 being preferred. It is preferably to have no more than 10 overlap areas within a single component.

In one embodiment the shield electrode extends beyond the projection of the first active area as illustrated in FIGS. 1 and 2. In one embodiment a shield electrode which is terminated extends beyond the first active area and projects over at least a portion of a second active area as more specifically illustrated in FIGS. 13 and 14.

The voltage breakdown of serial type capacitors is typically reduced significantly in air compared to inert fluid. Some examples of this are shown for the current prior art for serial MLCC below.

To evaluate the tendency for surface arcing in air between the terminals of ceramic capacitors, standard capacitor case sizes containing no internal electrodes were made with different ceramics noting the separations between the terminal electrodes. The surface arcing voltage results are shown in FIG. 3.

The surface arcing was determined for 25 pieces at each standard gap size at a voltage ramp rate of 300V/sec. The X7R dielectric material in this case was substantially barium titanate, a ferroelectric ceramic, and the C0G dielectric was substantially calcium zirconate a paraelectric material. Although these materials are very different in nature within the variance of the gap measurement there is not a significant difference in the average surface arcing voltage. However, there were no internal electrodes present in these samples. To determine how the presence of internal electrodes, in this case nickel, can alter the surface arcing voltage case size 1206 MLCC's with electrodes near to the surface were made. The standard gap between terminals was around 2.29 mm (0.09") and parts with different cover layer distances were evaluated to determine the effect of proximity to the surface as shown in FIG. 4. MLCC's were manufacture with distance "a" around 0.406 mm (0.016") and various cover layer thickness. The surface arcing voltage is compared to the cover layer thickness in FIG. 5. The results shown in FIG. 5 clearly show that the presence of internal electrodes has a profound effect on the surface arcing voltage since the occurrence is at a significantly lower voltage than measured in the samples without internal electrodes. Also, when internal electrodes are present the dielectric material can influence the arcing voltage. Thirdly, the cover layer thickness is an important design factor, in the case of C0G when the thickness is >0.203 mm (0.008") the surface arcing voltage appears to stabilize but >0.254 mm (0.010") is required for X7R. Since the presence of internal electrodes significantly influences surface arcing in multilayer ceramic capacitors their presence will affect the breakdown voltage of the capacitor. It is preferred that the MLCC have a cover layer of at least 0.18 mm (0.0070") above the shield layer to further protect against surface arcing.

Although serial designs currently in the art exhibit very high breakdown voltage their volume efficiency is low because of the aforementioned loss of effective total capacitance. U.S. Pat. No. 7,336,475 B2 discloses the use of top and bottom shield electrodes coupled with side shield electrodes to achieve high voltage capability in air without the need to arrange 2 or more capacitors in series within the MLCC thereby realizing higher capacitance. US Patent Application No. 2011, 0002082 A1 discloses MLCC designs without side shields and using patterned electrodes to retain high voltage breakdown with a high electrode overlap area for higher capacitance.

Shield MLCC's use a partial faraday cage design to prohibit arcing at the surface of the parts whilst retaining a high overlap area between electrodes of opposite polarity. Since the surface arcing is prohibited the voltage breakdown in fluid is very similar to that in air. The voltage breakdown results for all these MLCC's is summarized in Table 1.

TABLE 1

| | Case Size | | |
|---|---|---|---|
| | 1206 | 1812 | 1206 |
| | | Capacitance | |
| | 1000 pF | 4700 pF | 22000 pF |
| | | Rated Voltage | |
| | 1000 Vdc | 3000 Vdc | 1000 Vdc |
| | | Design | |
| | 2-Serial | 4-Serial | Shield |
| | | Test | |
| | Air | Liquid | Air | Liquid | Air | Liquid |
| Avg | 4458 | 7396 | 3586 | 10890 | 2472 | 2516 |
| Stdev | 809 | 1595 | 475 | 1035 | 207 | 313 |
| Min | 2940 | 4230 | 2439 | 9160 | 2160 | 1540 |
| Max | 5270 | 9680 | 4290 | 12000* | 2910 | 2940 |

*test equipment limit

In order to quantify the benefits of the asymmetric high voltage capacitor design 3 different MLCC designs were manufactured in an 1812 case size; a 4 Serial, a 3 Serial Non-Shielded and a 3 Serial Shielded using a similar structure to that depicted in FIG. 2 for the parts before singulation. The same X7R type electric, nickel inner electrodes and terminations were used in all 3 cases. Cross-sections of these different MLCC designs are shown in FIGS. 6, 7 and 8 respectively.

The designs and their measured capacitance and dissipation factors are summarized in Table 2.

TABLE 2

| Description | Number of Actives | Number of Shields | Dielectric Thickness (inch) | Cover Thickness (inch) | MLCC Thickness (inch) | Capacitance (nF) | Capacitance Std. Dev. | DF (%) |
|---|---|---|---|---|---|---|---|---|
| 4 Serial | 38 | 0 | 0.002 | 0.009 | 0.098 | 5.22 | 0.045 | 0.85 |
| 3 Serial Non-Shielded | 26 | 0 | 0.003 | 0.010 | 0.101 | 4.65 | 0.046 | 0.83 |
| 3 Serial Shielded | 25 | 2 | 0.003 | 0.009 | 0.102 | 4.60 | 0.051 | 0.79 |

Figure 9:
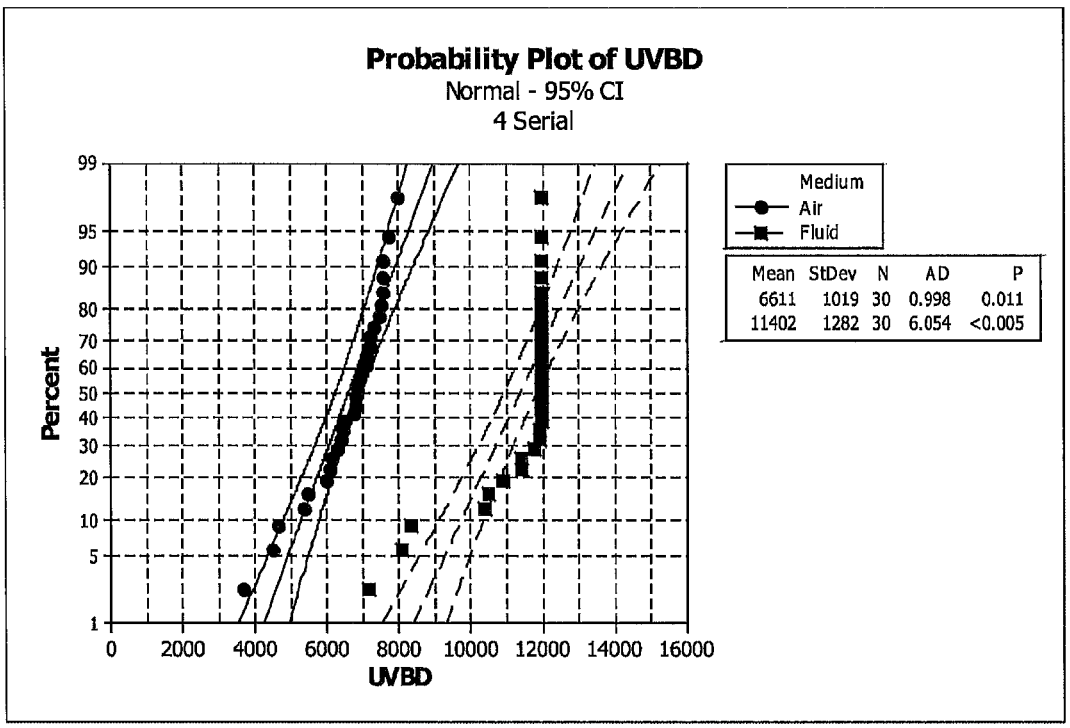
Figure 10:
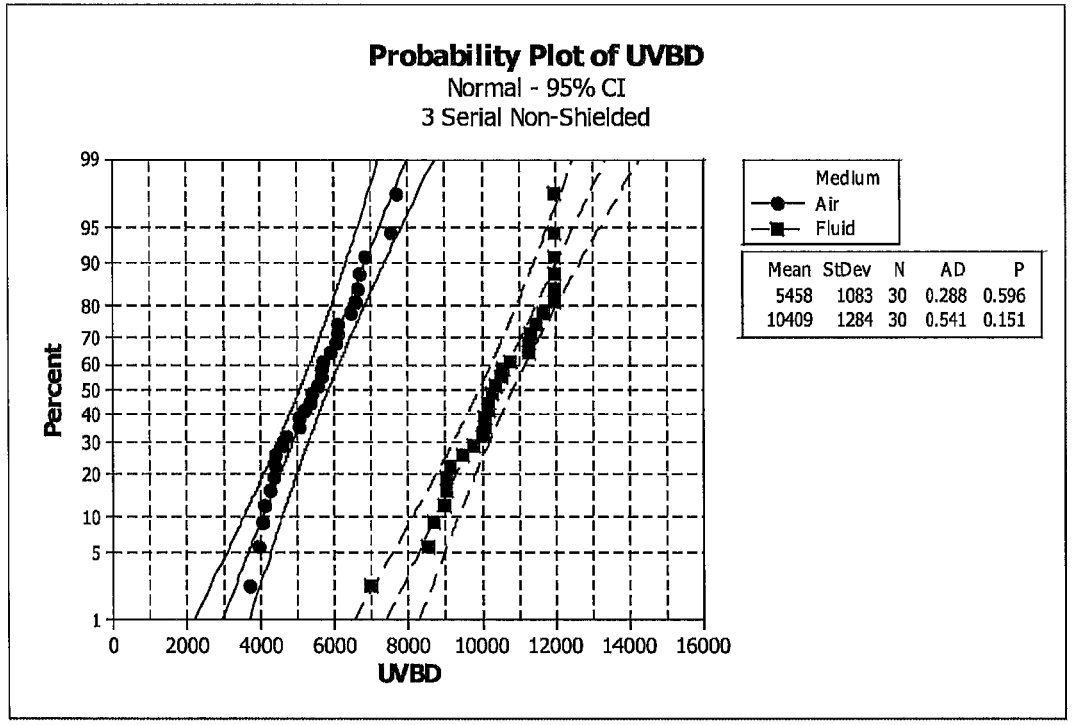
Figure 11:
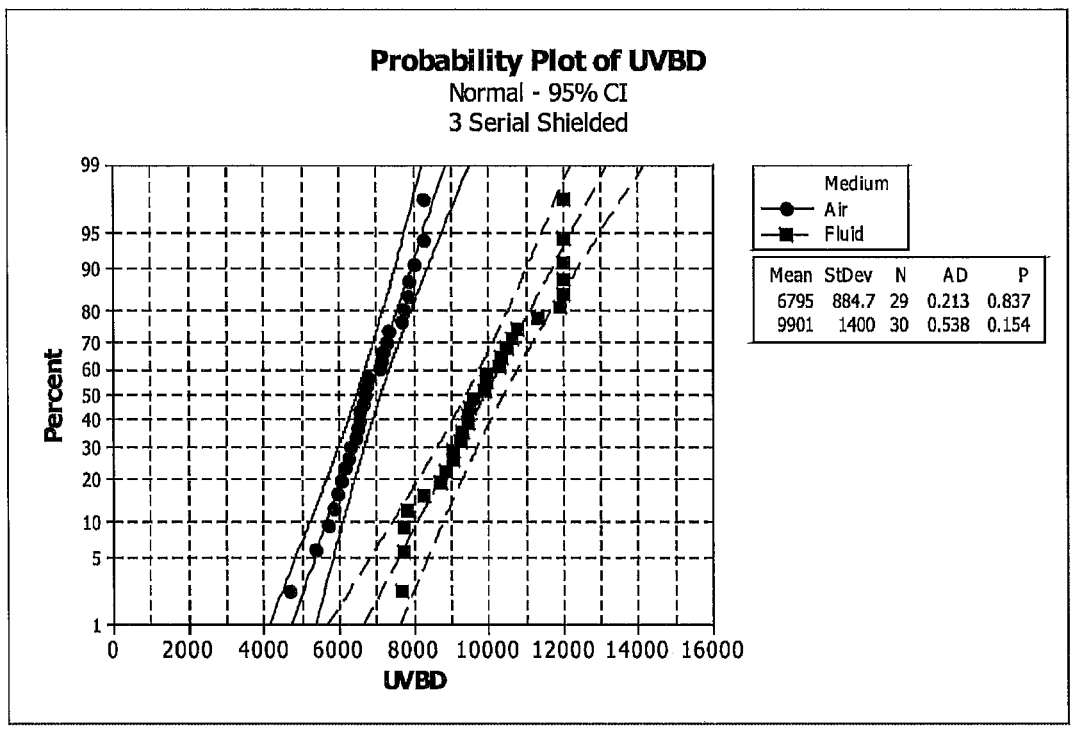
Figure 12:
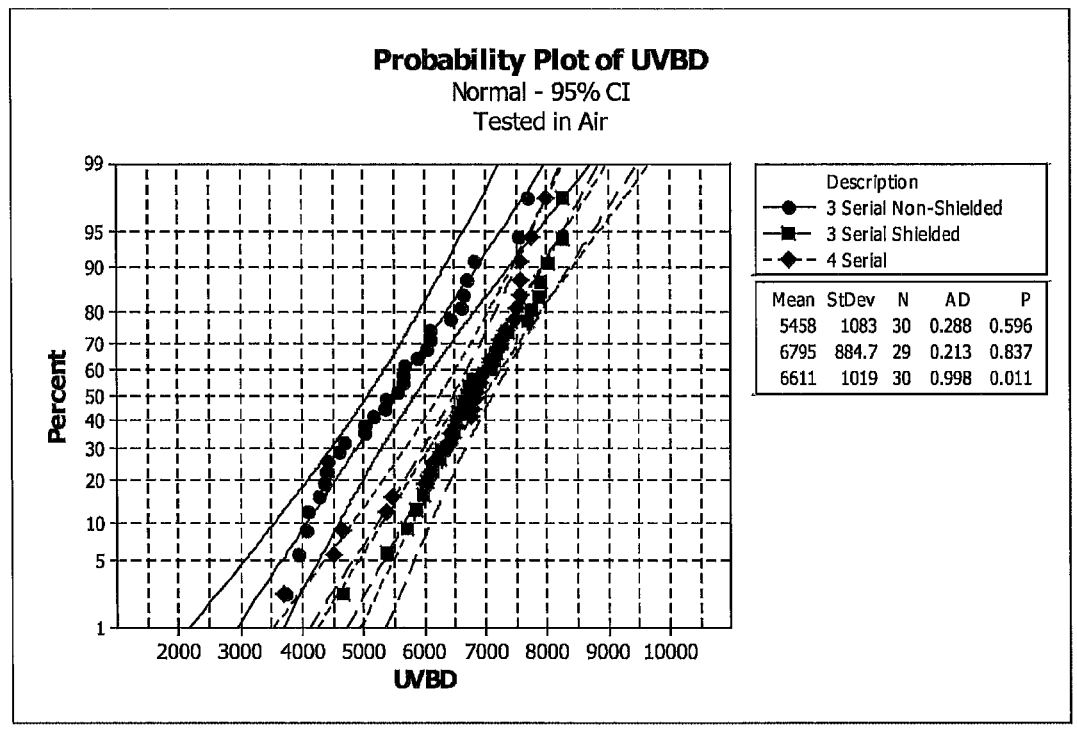

The 4 Serial MLCC has more and thinner active layers and achieves a higher capacitance although all 3 capacitor types are in the range of 4.7 nF+/−20%. The 4 Serial design is representative of current production whereas the 3 serial MLCC's are a departure from this and in both cases have significantly fewer electrodes that are desirable to reduce the cost of manufacture. However, the most important property is the ultimate voltage breakdown (UVBD). Samples of at least 29 pcs of each MLCC were measured for voltage breakdown in both air and fluid as shown in FIGS. 9, 10 and 11 for the 4 Serial, 3 Serial Non-Shielded and 3 Serial Shielded, respectively.

By comparing the voltage breakdown results of the 3 MLCC's it is clear that the gap between the distributions is narrowest between fluid and air for the asymmetrical 3 Serial Shielded MLCC. The distributions in air for the 3 different MLCC's demonstrate that the 3 Serial Shielded MLCC has the highest voltage breakdown as illustrated FIG. 12.

The lowest failure in air for the asymmetric 3 Serial Shielded MLCC is greater than 4000V and above the other 2 examples and the mean voltage breakdown is also higher. The asymmetrical 3 Serial Shielded MLCC represents the most effective design for high performance in air whilst retaining a sufficient capacitance with the lowest possible number of active layers.

The present invention provides an improved capacitor with a minimum breakdown voltage in air of at least 2500 V.

The benefit of the asymmetric high voltage capacitor design is clearly demonstrated. However, to further increase the capability of 4 Serial MLCC designs a long shield was added above and below the active area. This requires a different electrode pattern to be used. A diagram of this is shown with cut lines in FIG. 13 and a cross-section of the green part is shown in FIG. 14.

MLCC's were manufactured using the asymmetrical 4 Serial long shield design with cover layer thickness of 0.20 mm (0.008") and 0.40 mm (0.016") respectively and compared to control designs with similar cover layer thickness. The designs and their measured capacitance and dissipation factors are summarized in Table 3.

necessary for higher voltage ratings. One such breakdown at <2500V in the control made with 0.40 mm (0.016") cover layer has been circled in FIG. 17. Since it is not immediately obvious from voltage breakdown distribution of this compared to the shielded MLCC that they have a significant difference in performance the voltage breakdown test was repeated for a 60 piece sample form each capacitor. The control sample had another failure around 2600V due to arcing whereas the failures observed in the shielded MLCC occurred at higher voltages. Furthermore in air the average breakdown voltages for the shield MLCC are slightly higher compared to the controls with smaller standard deviations. These shielded designs therefore are beneficial for high voltage MLCC's designed to operate in air with no coating. The results in air also show an increase in average voltage breakdown from around 4700V to >5300V on increasing the cover layer thickness from 0.20 mm (0.008") to 0.40 mm (0.016").

The electrodes are not particularly limited herein with base metal or precious metal electrodes being suitable for demonstration of the invention.

The dielectric is not particularly limited herein. Ceramic dielectrics are particularly preferred due to their widespread use in the art and the vast knowledge of their use available in the art. The dielectric is typically chosen based on the choice of internal electrodes and the desired capacitance requirement as widely known in the art. It is well within the level of one of skill in the art to select a combination of internal electrode and dielectric suitable for demonstration of the invention. Ferroelectric, anti-ferroelectric and paraelectric materials are particularly suitable for demonstration of the invention.

The methods of firing, dicing and terminating are not particularly limited herein as these are standard in the art and those of skill in the art would be capable of selecting firing conditions, dicing method and termination structure suitable for demonstration of the invention.

The invention has been described with reference to the preferred embodiments without limit thereto. One of skill in the art would realize additional embodiments and improvements which are not specifically set forth herein but which are

TABLE 3

| Description | Number of Actives | Number of Shields | Dielectric Thickness (inch) | Cover Thickness (inch) | MLCC Thickness (inch) | Capacitance (nF) | Capacitance Std. Dev. | DF (%) |
|---|---|---|---|---|---|---|---|---|
| 4 Serial Shielded | 37 | 2 | 0.002 | 0.008 | 0.099 | 5.02 | 0.048 | 0.94 |
| 4 Serial Non-Shielded | 36 | 0 | 0.002 | 0.008 | 0.099 | 4.45 | 0.018 | 0.89 |
| 4 Serial Shielded | 29 | 2 | 0.002 | 0.016 | 0.098 | 4.07 | 0.017 | 0.95 |
| 4 Serial Non-Shielded | 28 | 0 | 0.002 | 0.016 | 0.098 | 3.50 | 0.025 | 0.95 |

Samples of at least 30 pcs of each MLCC were measured for ultimate breakdown voltage (UVBD) in both air and fluid as shown in FIGS. 15, 16, 17 and 18.

The voltage breakdown performance is very similar in air and fluid for inventive designs whereas in fluid the controls have a much higher voltage breakdown than that observed in air. Since fluid testing prevents surface arcing these results for the control MLCC indicate that coating will significantly increase the breakdown voltage for these parts but will have no benefit in the case of the shielded MLCC. However, when a similar performance in ultimate voltage breakdown is seen between air and fluid it is possible to use these MLCC's close to the minimum voltage breakdown. Furthermore in control MLCC's without shields there is a tendency for lower voltage breakdown occurrences because of an increased susceptibility to arcing at lower voltages making coating of these parts within the scope of the invention as more specifically set forth in the claims appended hereto.

What is claimed is:

1. A multi-layered ceramic capacitor comprising:
    an active area comprising first layers and second layers in alternating parallel arrangement with dielectric there between wherein said first layer comprises a first active electrode and a first floating electrode in a common plane and said second layer comprises a second active electrode and a second floating electrode in a second common plane;
    at least one shield layer adjacent to an outermost first layer of said first layers wherein said shield layer has a first projection and said first layers have a second projection wherein said first projection and said second projection are different; and wherein said shield layer further comprises a floating electrode.

2. The multi-layered ceramic capacitor of claim 1 further comprising a second shield layer adjacent to an outermost second layer of said second layers wherein said second shield layer has a third projection and said second layers have a fourth projection wherein said third projection and said fourth projection are different.

3. The multi-layered ceramic capacitor of claim 2 wherein said first projection and said third projection are the same.

4. The multi-layered ceramic capacitor of claim 1 wherein at least a portion of said shield layer and said first layer have a common polarity.

5. The multi-layered ceramic capacitor of claim 4 wherein said shield layer comprises two shield electrodes with each electrically terminated.

6. The multi-layered ceramic capacitor of claim 1 comprising at least two active overlap regions.

7. The multi-layered ceramic capacitor of claim 6 comprising at least three active overlap regions.

8. The multi-layered ceramic capacitor of claim 7 comprising up to ten active overlap regions.

9. The multilayer capacitors of claim 1 wherein said dielectric is a ceramic dielectric.

10. The multilayer ceramic capacitors of claim 9 wherein said ceramic dielectric is selected from the group consisting of ferroelectric, anti-ferroelectric and paraelectric material.

11. The multilayer ceramic capacitor of claim 1 with a minimum voltage breakdown in air of greater than 2500V.

12. The multilayer ceramic capacitor of claim 11 further comprising a cover layer with a thickness of greater than 0.18 mm (0.0070").

13. The multilayer ceramic capacitor of claim 1 wherein said capacitor does not comprise a coating.

14. An Electronic device containing the capacitor of claim 1.

15. A multi-layered ceramic capacitor comprising:
an active area comprising first layers and second layers in alternating parallel arrangement with dielectric there between wherein said first layer comprises a first active electrode and a first floating electrode in a common plane and said second layer comprises a second active electrode and a second floating electrode in a second common plane;
at least one shield layer adjacent to an outermost first layer of said first layers wherein said shield layer has a first projection and said first layers have a second projection wherein said first projection and said second projection are different wherein said at least one shield layer comprises a shield electrode which extends from a termination to beyond a projection of a first active region.

16. A method for forming a multilayer ceramic capacitor comprising:
forming interleaved first layers and second layers with dielectric there between wherein said first layers comprise first electrode patterns and said second layers comprise second electrode patterns and wherein said first electrode patterns and said second electrode patterns overlap in projection to form at least two active overlap regions;
forming at least one shield layer adjacent an outermost first layer of said first layers wherein said shield layer has a projection of electrode pattern which is different than a projection of said first electrode pattern and different than a projection of said second electrode pattern; and
wherein said at least one shield layer extends from a termination to beyond a projection of a first active region.

17. The method for forming a multilayer ceramic capacitor of claim 16 further comprising:
forming at least one second shield layer adjacent an outermost second layer of said second layers wherein said second shield layer has a projection of electrode pattern which is different than said projection of said first electrode pattern and different than said projection of said second electrode pattern.

18. The method for forming a multilayer ceramic capacitor of claim 16 wherein said first electrode pattern and said second electrode pattern are the same.

19. The method for forming a multilayer ceramic capacitor of claim 16 wherein at least a portion of said shield layer and said first layer have a common polarity.

20. The method for forming a multilayer ceramic capacitor of claim 19 wherein said shield layer comprises two shield electrodes with each electrically terminated.

21. The method for forming a multilayer ceramic capacitor of claim 16 comprising at least three active overlap regions.

22. The method for forming a multilayer ceramic capacitor of claim 21 comprising up to ten active overlap regions.

23. The method for forming a multilayer ceramic capacitor of claim 16 wherein said dielectric is a ceramic dielectric.

24. The method for forming a multilayer ceramic capacitor of claim 23 wherein said ceramic dielectric is selected from the group consisting of ferroelectric, anti-ferroelectric and paraelectric material.

25. The method for forming a multilayer ceramic capacitor of claim 16 wherein said multilayered ceramic capacitor has a minimum voltage breakdown in air of greater than 2500V.

26. The method for forming a multilayer ceramic capacitor of claim 16 further comprising forming a cover layer with a thickness of greater than 0.18 mm (0.0070").

27. A method for forming a multilayer ceramic capacitor comprising:
forming interleaved first layers and second layers with dielectric there between wherein said first layers comprise first electrode patterns and said second layers comprise second electrode patterns and wherein said first electrode patterns and said second electrode patterns overlap in projection to form at least two active overlap regions;
forming at least one shield layer adjacent an outermost first layer of said first layers wherein said shield layer has a projection of electrode pattern which is different than a projection of said first electrode pattern and different than a projection of said second electrode pattern wherein said shield layer further comprises a floating electrode.

* * * * *